May 5, 1925.
J. HARRIS
1,536,384
APPARATUS FOR CUTTING METALS
Filed Dec. 29, 1921
2 Sheets-Sheet 1
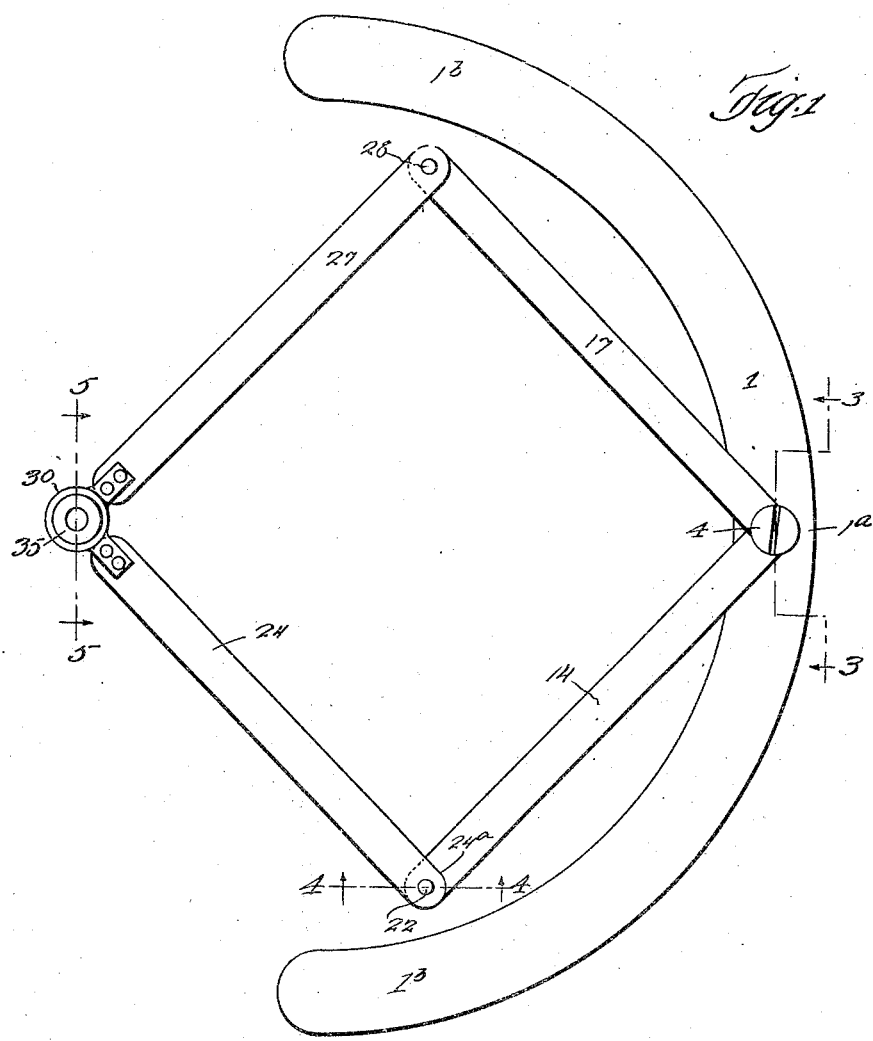
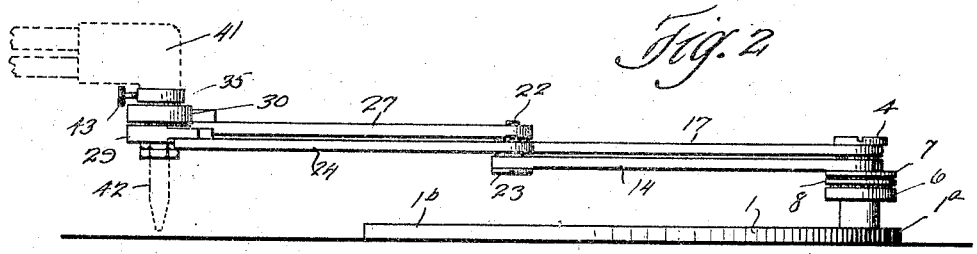

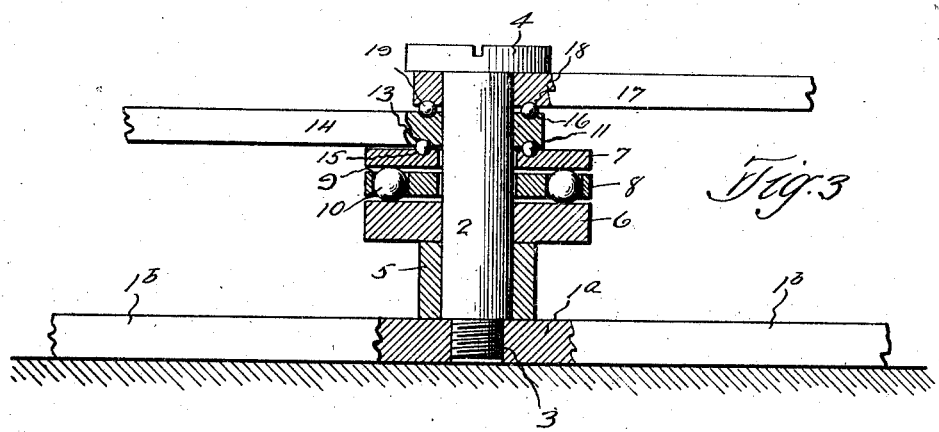

Patented May 5, 1925.

1,536,384

UNITED STATES PATENT OFFICE.

JOHN HARRIS, OF LAKEWOOD, OHIO, ASSIGNOR TO THE HARRIS CALORIFIC COMPANY, OF CLEVELAND, OHIO, A CORPORATION OF OHIO.

APPARATUS FOR CUTTING METALS.

Application filed December 29, 1921. Serial No. 525,617.

*To all whom it may concern:*

Be it known that I, JOHN HARRIS, a citizen of the United States, residing at Lakewood, in the county of Cuyahoga and State of Ohio, have invented a certain new and useful Improvement in Apparatus for Cutting Metals, of which the following is a full, clear, and exact description, reference being had to the accompanying drawings.

This invention relates to apparatus for cutting metals with gases, and has for its general object to provide an apparatus of this character which is extremely simple in construction and economical of production, and which will enable the blow pipe employed for the cutting operation to be operated in a particularly effective manner. Further and more limited objects of the invention will appear hereinafter; and the invention may be defined generally as consisting of the combinations of elements and parts embodied in the claims appended to and forming part hereof.

In the drawings, which illustrate the present preferred embodiment of my invention, Fig. 1 represents a plan view of an apparatus constituting such embodiment; Fig. 2 a side elevation of the apparatus shown in Fig. 1, illustrating the manner in which a cutting torch or blow pipe is supported thereby; and Figs. 3, 4 and 5 are sectional details corresponding, respectively, to the lines 3—3, 4—4, and 5—5 of Fig. 1 and looking in the direction of the arrows.

The apparatus illustrated and described herein comprises generally a concavo-convex base having at the center thereof a vertical bearing, a pair of arms pivoted at their ends on said bearing, a second pair of arms each pivoted to an end of one of the first mentioned arms which is remote from said bearing, and a bearing carried jointly by the opposite ends of the second pair of arms and constituting a vertical rotary support for a blow pipe.

Describing by reference characters the various parts illustrated herein, 1 denotes the base. This base is preferably of metal, and may be considered as having a central portion 1ª with a pair of arms 1ᵇ projecting therefrom, the said base being preferably semi-circular in shape whereby a concavity is formed therein for the manipulation of the blow pipe. This shape of the base enables the attached arms and the blow pipe to be operated within the arms 1ᵇ and at a considerable distance beyond a line joining the ends of the same without danger of overturning the base. Mounted in the center of the base is a stud 2, which may be threaded into an aperture 3 in such center, the stud having a head 4. Surrounding the aperture 3 and extending above the same is a sleeve 5 which constitutes a seat for the lower member 6 of a ball bearing, the upper member of which is indicated at 7, the intermediate member 8 being provided with apertures 9 for the balls 10, which balls are engaged respectively by the upper surface of the member 6 and by the lower surface of the race member 7.

The upper surface of the race member 7 is provided with a ball race 11 between which and a race 13 provided in the lower surface of the inner end of an arm 14 a series of balls 15 are inserted. The upper surface of the same end of the arm 14 is provided with a race 16, between which and a race 18 formed in the lower surface of the corresponding end of another arm 17 a series of balls 19 are inserted. The parts 6–19, inclusive, are mounted upon the stud 2, between the head 4 of the latter and the sleeve 5.

The opposite end of the arm 14 is provided with a race 20 in the upper surface thereof, the race surrounding an aperture 21 through which there extends a stud 22 having a head 23 at its lower end. Cooperating also with the stud is the end 24ª of an arm 24, the said arm having an aperture for the stud 22 and being provided in its under surface with a race 25 cooperating with the race 20, balls 26 being inserted between said races. The arm 17 is also provided at the end remote from the stud 2 with a race similar to the race 20, said race and a set of balls (not shown) cooperating with a race similar to the race 25 in the end of an arm 27, the cooperating ends of the arms 17 and 27 being provided with aligned apertures for the reception of a stud 28, similar to the stud 22. In other words, the manner of connecting the arms 14 and 24 shown in Fig. 4 is duplicated for the corresponding ends of the arms 17 and 27.

For convenience of description, the ends of the arms 14 and 17 and 24 and 27 which are normally nearest the stud 2 will be referred to as the "inner" ends of said arms, the opposite ends of the arms being referred to as the "outer" ends of said arms.

The outer ends of the arms 24 and 27 are provided each with a ring, indicated at 29 and 30 respectively, the rings having cooperating races 31 and 32, with a series of balls 33 therein, and the said rings being pivotally mounted upon a hollow stud or sleeve 34 having at its upper end a head 35, the lower end of said sleeve or stud being threaded for the reception of a cooperating head 36 and a lock nut 37. The upper surface of the ring 30 is provided with a race 38 and the lower surface of the head 35 with a race 39 between which are inserted the balls 40. The sleeve 34 provides, with the rings 29 and 30 and the balls 40, a vertical antifriction bearing for supporting the blow pipe, indicated generally at 41 (Fig. 2). The sleeve 34 is of an internal diameter to receive the tip 42 of the blow pipe, the blow pipe being conveniently secured in place by means of a set screw 43 mounted in the head 35.

The operation of the device will be readily understood. A blow pipe inserted in the sleeve 34 will be carried at the outer end of the arm assembly 14, 17, 24 and 27 and can be moved conveniently and without material friction to any desired position within the base 1 as well as beyond the said base, in the direction of the arms 1ᵇ. The manner of mounting the blow pipe enables the latter to direct its cutting flame perpendicularly against the surface of the metal to be cut. By means of the set screw, the blow pipe may be maintained at a proper and constant distance from any particular piece of work. The pipe may be most conveniently manipulated for the purpose of cutting varying shapes and without any danger of tangling the tubes, since the latter can lead away from the central pivot sleeve 34 and, as the blow pipe turns freely with such sleeve, there will be no danger of tangling the tubes no matter into what position the blow pipe may be moved by means of the pivoted arm-assembly. A blow pipe mounted in the manner shown herein may be used as a straight-line cutter; with a guide to cut a pattern, and can always direct the cutting jets perpendicularly to the work, enabling straight and smooth cutting to be performed.

Having thus described my invention, what I claim is:

1. In an apparatus of the character described, the combination of a base, a vertical stud carried by said base and having an anti-friction bearing, an arm mounted upon said bearing, a second anti-friction bearing on said stud above the first mentioned arm, an anti-friction bearing interposed between the portions of the arms mounted on said stud, a stud extending through the outer end of each of the first mentioned arms, a second pair of arms having their inner ends mounted upon the studs provided at the outer ends of the first mentioned pair of arms, respectively, anti-friction devices interposed between the outer ends of the first mentioned arms and the inner ends of the second mentioned arms, a hollow stud or sleeve extending through and connecting the outer ends of the second pair of arms, anti-friction devices interposed between such connected ends, a head on said hollow stud or sleeve, and anti-friction devices interposed between said head and the upper surface of the end of the arm therebeneath.

2. An apparatus of the character described comprising a base, a vertical stud carried by said base, a pair of arms each having its inner end mounted upon said stud, there being a ball bearing for such inner end of each arm surrounding said stud, a vertical stud carried by the outer end of each of said arms, an arm having its inner end mounted upon each of the last mentioned studs, with a ball bearing interposed between each such inner end and the outer end of the corresponding arm, a bearing sleeve extending through the outer ends of the second pair of arms, a ball bearing for the said sleeve, and a ball bearing interposed between the connected outer portions of the second pair of arms and surrounding the said sleeve.

In testimony whereof, I hereunto affix my signature.

JOHN HARRIS.